United States Patent [19]

Bemiss

[11] 4,242,951
[45] Jan. 6, 1981

[54] AIR INTAKE VENT FOR ARMORED VEHICLE

[75] Inventor: James M. Bemiss, St. Clair Shores, Mich.

[73] Assignee: Cadillac Gage Company, Warren, Mich.

[21] Appl. No.: 64,325

[22] Filed: Aug. 6, 1979

[51] Int. Cl.$^3$ .......................... B60H 1/28; B60H 3/06
[52] U.S. Cl. ............................... 98/2.11; 55/385 B; 55/385 F; 98/2.16
[58] Field of Search .................. 98/2, 2.07, 2.11, 2.16, 98/2.17, 64, 2.06; 55/385 R, 385 B, 385 F, 504, 511

[56] References Cited

U.S. PATENT DOCUMENTS

| | | | |
|---|---|---|---|
| 1,474,075 | 11/1923 | Gallaugher | 98/2.17 |
| 2,213,017 | 8/1940 | Perkins | 98/2.17 X |
| 2,232,108 | 2/1941 | Giacomini | 98/2.14 |
| 2,489,011 | 11/1949 | Dahlin | 98/64 X |
| 3,884,134 | 5/1975 | Jordan | 98/64 |

FOREIGN PATENT DOCUMENTS 2138951 2/1973 Fed. Rep. of Germany ............ 98/2.11

*Primary Examiner*—Albert J. Makay
*Assistant Examiner*—Harold Joyce

*Attorney, Agent, or Firm*—Reising, Ethington, Barnard, Perry & Brooks

[57] ABSTRACT

An air intake vent (20) for the cowl opening (24) of an armored vehicle includes a front armor plate (26) extending upwardly from the cowl (22) forward of the opening and a holder (30) for mounting an air filter (32) over the cowl opening, and the vent also includes a flanged cover (34) that prevents projectiles from passing through the cowl opening while still permitting air to enter the vehicle. A front flange (36) of the cover extends downwardly in front of the front armor plate preferably with an inclined orientation so as to provide good deflection of projectiles away from the cowl opening. A pair of side armor plates (38) extend upwardly from the cowl on opposite lateral sides of the opening thereof and side flanges (44) on the cover extend downwardly outboard therefrom in a spaced relationship. The holder for the air filter includes an L-shaped rear mount (30) that positions the rear extremity (45) of a mounted filter such that the front and side extremities (46, 47) thereof are respectively positioned by the front and side armor plates on the cowl. Supports (48, 52) for the cover are mounted on the front and side armor plates and have a construction that permits removal and mounting of an air filter for servicing or replacement.

11 Claims, 3 Drawing Figures

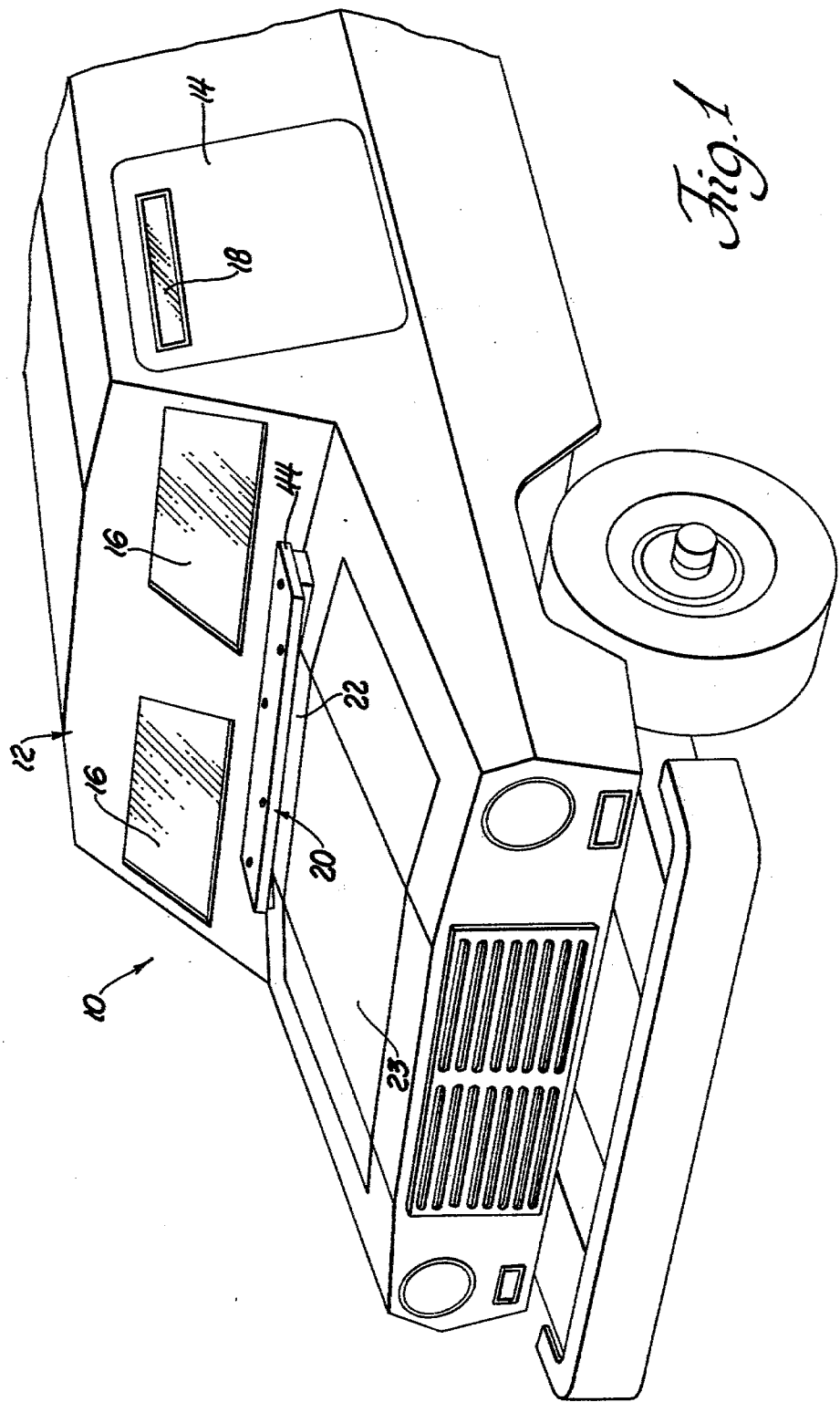

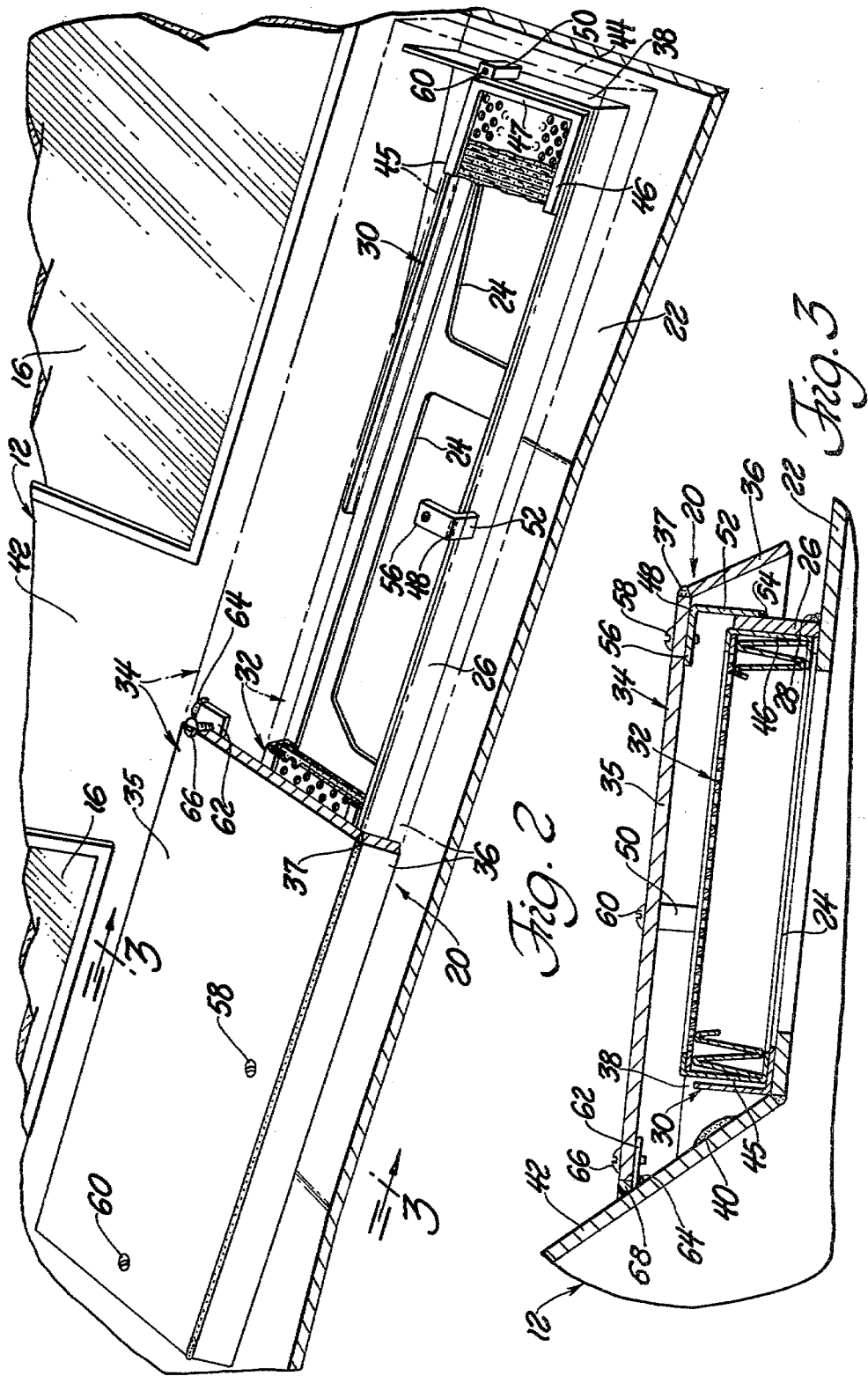

AIR INTAKE VENT FOR ARMORED VEHICLE

TECHNICAL FIELD

This invention relates generally to an air intake vent for use on the cowl opening of an armored vehicle.

BACKGROUND ART

Passenger vehicles conventionally include an air intake vent located on the cowl between the front windshield and the rear end of the engine compartment hood. Such cowl vents normally include exposed openings through which air enters prior to passage into the passenger compartment to provide ventilation.

Armored vehicles are conventionally made from metal armor plate so as to be capable of stopping projectiles such as bullets or shrapnel. Air intake openings on armored vehicles conventionally utilize louvers or the like to define relatively small openings that are not big enough to allow a projectile of the normal size to pass into the vehicle. The cross-sectional area of air flow is thus smaller for any given size of such a vent as a result of the louvers located between the openings. Also, many armored vehicles are utilized for both on-road and off-road purposes and the air that is taken in by an intake vent on the cowl opening thereof thus quite often carries dust.

DISCLOSURE OF INVENTION

An object of the present invention is to provide an improved air intake vent for the cowl of an armored vehicle so as to prevent projectiles from passing through a cowl opening thereof while still providing efficient air flow for ventilating the passenger compartment as well as removal of dust from the air upon flow through the vent.

In carrying out the above object, the air intake vent includes a front armor plate that extends upwardly from the vehicle cowl forwardly of its opening. A holder of the intake vent is provided to mount an air filter over the cowl so that the air which enters through the cowl opening has dust removed prior to being fed to the passenger compartment. A cover of armor plate is mounted over the cowl opening spaced above the front armor plate and includes a front flange that extends downwardly forward of the front armor plate in a spaced relationship thereto so as to prevent projectiles from passing through the cowl opening while still permitting air to enter the vehicle.

In its preferred construction, the air intake vent has the front flange on the cover thereof extending forwardly as well as downwardly at an inclined orientation forward of the front armor plate on the cowl in order to provide good deflection of projectiles. A pair of side armor plates also extend upwardly from the cowl on opposite lateral sides of the cowl opening. Side flanges on the cover are respectively associated with the side armor plates extending downwardly located outboard therefrom in a spaced relationship. The air filter holder includes a rear mount that positions the rear extremity of a mounted filter such that the forward and side extremities thereof are respectively positioned by the front and side armor plates on the cowl.

Supports for the cover are mounted by the front and side armor plates on the cowl and have constructions that allow the air filters to be removed and mounted for replacement or servicing. The cover supports on the front armor plate have L shapes including lower legs secured to the front armor plate and upper legs that are detachably secured to the cover extending rearwardly from the associated lower legs. The cover supports on the side armor plates have lower ends respectively secured to the outboard extremities of the side armor plates and have upper ends that are detachably secured to the cover. An additional cover support on the vehicle rearward of the cowl opening detachably secures a rear edge of the cover intermediate opposite lateral extremities of the vent.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a perspective view of an armored vehicle whose cowl includes an air intake vent that is constructed in accordance with the present invention;

FIG. 2 is a perspective view of the air intake vent shown in FIG. 1 but partially broken away in order to illustrate its construction; and FIG. 3 is an elevation view taken in section along line 3—3 of FIG. 2 through the air intake vent.

BEST MODE FOR CARRYING OUT THE INVENTION

Referring to FIG. 1 of the drawings, an armored vehicle generally indicated by 10 includes a body 12 that is constructed from metal armor plate of a suitable thickness and composition so as to be capable of stopping projectiles such as bullets and shrapnel. The passenger compartment of the vehicle 10 is accessible through side doors 14 (only one shown) as well as through an unshown rear door. A vehicle passenger can observe the surrounding terrain through bulletproof front windshields 16 as well as through a bulletproof window 18 of the side door 14.

An air intake vent that is constructed in accordance with the present invention is indicated generally by 20 in FIG. 1 and is located on the vehicle cowl 22 forward of the front windshields 16 and just to the rear of the engine hood 23. As seen additionally in FIGS. 2 and 3, the cowl 22 includes openings 24 at which the vent 20 is located. A front armor plate 26 of the vent has a lower edge that is secured to the cowl 22 by welds 28 (FIG. 3) just forward of the cowl openings 24 so as to extend in an upward direction. A holder 30 of the vent mounts an air filter 32 over the cowl openings 24 behind the front armor plate 26. The intake vent also includes a cover 34 that is welded from armor plate and mounted over the air filter 32 in a manner that is hereinafter described. Cover 34 includes a main plate 35 and a front flange 36 secured to the main plate by a weld 37 so as to extend downwardly forward of the front armor plate 26 in a spaced relationship thereto in order to prevent projectiles from passing through the cowl openings while still permitting air to enter the vehicle after first passing through the filter 32. It will be noted that the front flange 36 on the cover extends forwardly as well as downwardly in an inclined orientation so as to provide good deflection of projectiles that strike the front flange.

With reference to FIG. 2, each lateral side of the air intake vent 20 includes an associated side armor plate 38 that is welded to the cowl 22 in the same manner as the front armor plate 26 extending upwardly from the cowl outboard from the openings 24. The front end of each side armor plate 38 is welded to the adjacent lateral side of the front armor plate 26 and the rear end of the side armor plate is likewise secured by a weld 40 (FIG. 3) to an inclined armor plate 42 on which the front windshields 16 are mounted. Each lateral side of the cover 34 includes an associated side flange 44 whose upper and front edges are respectively welded to the lateral edges of the cover plate 35 and front flange 36 so as to extend downwardly outboard from the side armor plates 38 in a spaced relationship.

Filter holder 30 shown in FIGS. 2 and 3 comprises an L-shaped mount that is secured in a suitable manner to the cowl 22 at a location just to the rear of the cowl openings 24 where the cowl is welded to the inclined plate 42. The L-shaped mount of holder 30 engages the rear extremity of the filter 32 at its rear edge 45 so that the front and side extremities of the filter are respectively positioned by the front and side armor plates 26 and 38. Thus, the front edge 46 of the filter 32 engages the front armor plate 26 and rests on the cowl 22 in order to properly locate the filter over the openings 24. Likewise, the side armor plates 38 engage the side edges 46 of the air filter 32 in order to laterally locate the filter on the cowl.

Cover 34 is detachably mounted on the cowl 22 by supports 48 and 50 that are respectively located on the front and side armor plates 26 and 38. Each cover support 48 on the front armor plate 26 has an L shape including a lower leg 52 that is secured to the front armor plate by a weld 54 (FIG. 3). An upper leg 56 of each L-shaped support 48 extends rearwardly from the lower leg 52 thereof and includes a suitable threaded opening that receives an associated screw 58 to detachably secure the front edge on the plate 35 of cover 34. Each of the cover supports 50 on the side armor plates 38 has a lower end that is welded to the outboard extremity or side of the associated side armor plate and has an upper end with a suitable threaded hole for receiving an associated threaded screw 60 to detachably secure the adjacent lateral edge on the plate 35 of the cover. An additional cover support 62 is secured to a weld 64 to the inclined plate 42 and includes a threaded opening that receives a threaded screw 66 to detachably secure the rear edge of the cover plate 35 midway between its lateral sides.

Cover supports 48, 50, and 62 shown in FIGS. 2 and 3 thus position the cover 34 upwardly above the front and side armor plates 26 and 38 in a spaced relationship so that the air can flow under the front and side cover flanges 36 and 44 and then over the front and side armor plates prior to passing through the filter 32 and then through the cowl openings 24 into the passenger compartment of the vehicle. The construction of the supports 48 and 50 allows the filter 32 to be mounted and removed for replacement and servicing.

Also, as seen in FIG. 3, the main plate 35 of the cover has a rear edge and a seal 68 therefor that engages the inclined plate 42 of the vehicle. Seal 68 is also positioned between rear edges of the side cover flanges 44 to prevent fluid from entering through the vent. Thus, rain during daily use and flaming fluid from gas bombs during warfare are prevented from entering through the vent by the provision of the rear seal.

While the best mode for carrying out the invention has been herein described in detail, those familiar with the art to which this invention relates will recognize various alternative designs and embodiments for practicing the present invention as defined by the following claims.

What is claimed is:

1. In an armored vehicle including a cowl having an opening, an air intake vent comprising: a front armor plate welded to the cowl so as to extend upwardly therefrom spaced forward of the opening therethrough, a holder for mounting an air filter over the cowl opening with the filter supported on the cowl forward of the opening therethrough, a cover of armor plate mounted over the cowl opening spaced above the front armor plate on the cowl, and a front flange on the cover extending downwardly forward of the front armor plate in a spaced relationship thereto, the front cover flange having a lower edge terminating below the upper extremity of the front armor plate in an upwardly spaced relationship from the cowl so as to prevent projectiles from passing through the cowl opening while still permitting air to enter the vehicle.

2. A vent as in claim 1 wherein the front flange of the cover extends forwardly as well as downwardly in an inclined orientation forwardly of the front armor plate on the cowl.

3. A vent as in claims 1 or 2 further including a pair of side armor plates extending upwardly from the cowl on opposite lateral sides of the opening thereof, and the cover including a pair of side flanges respectively associated with the side armor plates extending downwardly located outboard therefrom in a spaced relationship.

4. A vent as in claim 3 further including cover supports extending upwardly from the front and side armor plates to mount the cover thereon in an upwardly spaced relationship.

5. A vent as in claim 4 wherein the cover supports on the front armor plate have L shapes including lower legs secured to the front armor plate and upper legs detachably secured to the cover, and each cover support on the side armor plates having a lower end secured to the associated side armor plate and an upper end detachably secured to the cover.

6. A vent as in claim 1 wherein the air filter holder includes a rear mount that positions the rear extremity of a mounted filter such that the front extremity thereof is positioned by the front armor plate.

7. In an armored vehicle including a cowl having an opening, an air intake vent comprising: a front armor plate welded to the cowl so as to extend upwardly therefrom spaced forward of the opening therethrough, a pair of side armor plates extending upwardly from the cowl on opposite lateral sides of the cowl opening, a holder for mounting an air filter over the cowl opening with the filter supported on the cowl forward of the opening therethrough, the holder including a rear mount secured to the cowl so as to position a rear extremity of the filter such that front and side extremities of the filter are positioned by the front and side armor plates, a cover of armor plate mounted over the cowl opening spaced above the front and side armor plates on the cowl, the cover including a front flange extending downwardly forward of the front armor plate on the cowl, and the cover also including a pair of side flanges respectively associated with the side armor plates on the cowl extending downwardly located outboard therefrom in a spaced relationship, the cover flanges having lower edges terminating below the upper extremities of the front and side armor plates in an upwardly space relationship from the cowl whereby the vent prevents projectiles from passing through the cowl opening while still permitting air to enter the vehicle.

8. In an armored vehicle including a cowl having an opening, an air intake vent comprising: a front armor plate welded to the cowl so as to extend upwardly therefrom spaced forward of the opening therethrough, a pair of side armor plates extending upwardly from the cowl on opposite lateral sides of the cowl opening, a holder for mounting an air filter over the cowl opening with the filter supported on the cowl forward of the opening therethrough, the holder including a rear mount secured to the cowl so as to position a rear extremity of the filter such that front and side extremities of the filter are positioned by the front and side armor plates, a cover of armor plate, supports that mount the cover over the cowl opening spaced above the front and side armor plates, the cover including a front flange extending downwardly and forwardly in an inclined orientation forward of the front armor plate on the cowl, and the cover also including a pair of side flanges respectively associated with the side armor plates on the cowl extending downwardly located outboard therefrom in a spaced relationship, the cover flanges having lower edges terminating below the upper extremities of the front and side armor plates in an upwardly space relationship from the cowl whereby the vent prevents projectiles from passing through the cowl opening while still permitting air to enter the vehicle.

9. A vent as in claim 8 wherein the cover supports are mounted on the front and side armor plates, the cover supports on the front armor plate having L shapes including lower legs secured to the front armor plate and upper legs that extend rearwardly from the associated lower legs and are detachably secured to the cover, the cover supports on the side armor plates including lower ends respectively secured thereto and also including upper ends that are detachably secured to the cover, and the cover supports on the side armor plates being located at outboard extremities of the side armor plates so as to permit air filter mounting and removal.

10. A vent as in claim 9 further including an additional cover support on the vehicle rearward of the cowl opening intermediate opposite lateral extremities of the vent.

11. A vent as in claim 8 wherein the cover includes a rear edge and a seal therefor in order to prevent fluid entry at the rear extremity of the vent.

* * * * *